(12) United States Patent
Arndt et al.

(10) Patent No.: US 7,970,952 B2
(45) Date of Patent: *Jun. 28, 2011

(54) PERFORMANCE COUNTERS FOR VIRTUALIZED NETWORK INTERFACES OF COMMUNICATIONS NETWORKS

(75) Inventors: Richard L. Arndt, Austin, TX (US);
Bruce L. Beukema, Hayfield, MN (US);
David Craddock, New Paltz, NY (US);
Ronald E. Fuhs, Rochester, MN (US);
Thomas A. Gregg, Highland, NY (US);
Donald W. Schmidt, Stone Ridge, NY (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 12/472,648

(22) Filed: May 27, 2009

(65) Prior Publication Data

US 2009/0234974 A1 Sep. 17, 2009

Related U.S. Application Data

(63) Continuation of application No. 11/247,872, filed on Oct. 11, 2005, now Pat. No. 7,548,964.

(51) Int. Cl.
*G06F 15/16* (2006.01)

(52) U.S. Cl. ................................ 709/250; 713/100; 710/8

(58) Field of Classification Search .................. 709/250, 709/224; 713/1–2, 100; 710/8, 104
See application file for complete search history.

(56) References Cited

U.S. PATENT DOCUMENTS

| 5,881,223 | A | 3/1999 | Agrawal et al. |
| 6,360,337 | B1 | 3/2002 | Zak et al. |
| 6,765,873 | B1 | 7/2004 | Fichou |
| 6,792,392 | B1 | 9/2004 | Knight |
| 7,283,473 | B2 | 10/2007 | Arndt et al. |
| 7,548,964 | B2 | 6/2009 | Arndt et al. |
| 7,657,617 | B1 * | 2/2010 | Roussos et al. ............ 709/223 |

(Continued)

OTHER PUBLICATIONS

InfiniBand Architecture Specification, vol. 1, Release 1.2, 2004, pp. 138, 651, 667, 704, 725, 732, 737, 749-769, 1004.

(Continued)

*Primary Examiner* — Salad Abdullahi
(74) *Attorney, Agent, or Firm* — Steven Chiu, Esq.; Blanche E. Schiller, Esq.; Heslin Rothenberg Farley & Mesiti P.C.

(57) ABSTRACT

Performance counters are provided for virtualized network interfaces of communications networks, while minimizing the use of hardware resources. A virtualized network interface includes physical resources, as well as logical resources. Dedicated performance counters are provided for the physical resources of the virtualized network interface, as well as for logical partitions coupled to that interface, while non-dedicated performance counters are provided for the logical resources. This enables the provision of performance counters for virtualized network interfaces, while minimizing hardware resources consumed by those interfaces.

16 Claims, 6 Drawing Sheets

U.S. PATENT DOCUMENTS

| | | |
|---|---|---|
| 2003/0016670 A1 | 1/2003 | Seidl et al. |
| 2003/0033555 A1 | 2/2003 | Joyner et al. |
| 2003/0200315 A1* | 10/2003 | Goldenberg et al. ......... 709/225 |
| 2003/0204595 A1* | 10/2003 | Lev et al. ...................... 709/226 |
| 2004/0202189 A1 | 10/2004 | Arndt et al. |
| 2004/0233911 A1 | 11/2004 | Morris |
| 2005/0060445 A1 | 3/2005 | Beukema |
| 2006/0206300 A1 | 9/2006 | Garg et al. |

OTHER PUBLICATIONS

Chinese Office Action issued for Chinese Patent Publication No. 2006-10153915.1, dated Mar. 10, 2010.

Final Office Action for U.S. Appl. No. 11/247,872 dated Jul. 22, 2008.

Office Action for U.S. Appl. No. 11/247,872 dated Feb. 6, 2008.

\* cited by examiner

PERFORMANCE COUNTERS FOR VIRTUALIZED NETWORK INTERFACES OF COMMUNICATIONS NETWORKS

This application is a continuation of co-pending U.S. patent application Ser. No. 11/247,872, filed Oct. 11, 2005, entitled "PERFORMANCE COUNTERS FOR VIRTUALIZED NETWORK INTERFACES OF COMMUNICATIONS NETWORKS," Arndt et al., the entirety of which is hereby incorporated herein by reference.

TECHNICAL FIELD

This invention relates, in general, to virtualized network interfaces of communications networks, and in particular, to minimizing hardware resources consumed by the virtualized interfaces.

BACKGROUND OF THE INVENTION

Virtualized network interfaces, such as virtualized channel adapters, are capable of being shared by multiple operating systems running, for instance, in different logical partitions of a logically partitioned computing environment. A virtualized network interface is a physical network interface that includes a plurality of logical network interfaces. A logical network interface is coupled to an operating system. The operating system may be coupled to one or more logical network interfaces, but a logical network interface is coupled to one operating system. One example of a virtualized network interface is the INFINIBAND® host channel adapter, which is described in U.S. Pat. No. 7,283,473, entitled "Apparatus, System And Method For Providing Multiple Logical Channel Adapters Within A Single Physical Channel Adapter In A System Area Network," Arndt et al., issued Oct. 16, 2007, which is hereby incorporated herein by reference in its entirety.

There may be a large number of logical network interfaces per a physical network interface. Therefore, dedication of hardware resources, like hardware performance counters, to each logical network interface is problematic. A virtualized physical network interface can consume large amounts of hardware resources, thereby limiting scalability of the design and increasing costs.

Thus, a need exists for a capability that enables the provision of performance counters for virtualized network interfaces, while minimizing the use of hardware resources.

SUMMARY OF THE INVENTION

The shortcomings of the prior art are overcome and additional advantages are provided through the provision of a computer program product for providing performance counters for virtualized network interfaces of communications networks. The computer program product includes, for instance, a storage medium readable by a processor and storing instructions for execution by the processor for performing a method including having a virtualized physical network interface of a communications network, wherein the virtualized physical network interface comprises a plurality of resources, including at least one physical port and a plurality of logical host channel adapters, the plurality of logical host channel adapters being coupled to a plurality of logical partitions of a computing environment; providing performance counters for at least multiple resources of the plurality of resources, wherein the providing a performance counter for a particular resource of the multiple resources is based on whether the particular resource is a physical port or a logical host channel adapter, wherein one type of performance counter is provided for a physical port and a different type of performance counter is provided for a logical host channel adapter, wherein the providing includes providing at least one dedicated hardware performance counter to the at least one physical port; and providing one or more programmable counters for the plurality of logical host channel adapters, the one or more programmable counters to be shared by the plurality of logical host channel adapters, and wherein at least one programmable counter of the one or more programmable counters is associated with a logical host channel adapter of the plurality of logical host channel adapters in response to a request, during processing, for performance data, rather than being dedicated to the logical host channel adapter.

System(s) corresponding to the above-summarized computer program product are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, performance counters are provided for virtualized network interfaces of communications networks of communications environments. As an example, dedicated performance counters are provided for the physical ports of a virtualized network interface, as well as for logical partitions coupled to the network interface. Further, for the logical resources of the virtualized network interface, such as the logical network interfaces and/or logical network ports of the network interface, programmable counters are provided. These programmable counters are not dedicated to the logical resources, but instead, are associated with the logical resources during processing. By providing non-dedicated performance counters to the logical resources, the use of hardware resources for performance counters is minimized. This improves scalability of the physical network interface, as well as costs.

Figure 1:
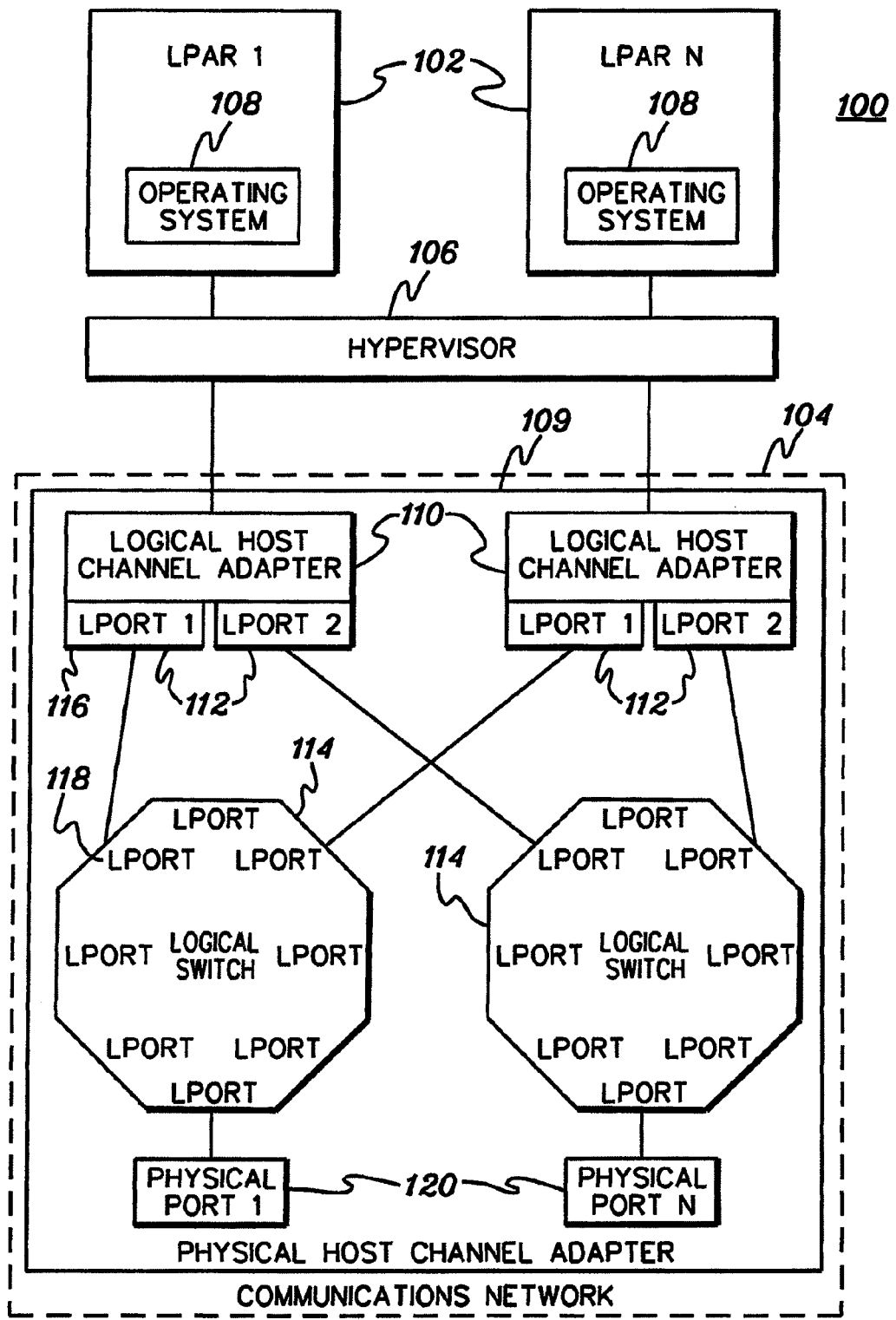
FIG. 1 depicts one example of a communications network having a virtualized physical host channel adapter, in accordance with an aspect of the present invention.

One embodiment of a communications environment incorporating and using one or more aspects of the present invention is described with reference to FIG. 1. A communications environment 100 is a logically partitioned environment, including one or more logical partitions 102 coupled to a communications network 104 via a hypervisor 106.

A logical partition 102 may execute an operating system image 108, such as the Linux, AIX or z/OS operating systems, as examples. AIX and z/OS are offered by International Business Machines Corporation, Armonk, N.Y. Each partition may execute the same type of operating system or different types, and operating systems running in different partitions have no knowledge or interaction with one another. The operating systems mentioned above are offered as examples. Other operating systems and/or other control code may be executed by one or more of the logical partitions.

The logical partitions are coupled to a hypervisor 106 that is used herein to obtain performance data for components of the communications network coupled to the hypervisor. One example of a suitable hypervisor is the pSeries® POWER Hypervisor (PHYP) provided with the pSeries® server offered by International Business Machines Corporation, and described in a Redbook entitled "CPU Resource Distribution by POWER Hypervisor and Partition Load Manager," IBM Form Number TIPS0427, published Oct. 16, 2004, which is hereby incorporated herein by reference in its entirety.

Communications network 104 is, for instance, a system area network (SAN) that provides a high-bandwidth, low-latency network used to interconnect nodes of a communications environment. The communications network includes one or more physical network interfaces 109. In this example, the physical network interface is a physical host channel adapter. However, in other embodiments, other types of network interfaces can incorporate, use and/or benefit from one or more aspects of the present invention.

Physical host channel adapter 109 is a virtualized adapter that has been logically partitioned to include a plurality of logical host channel adapters 110 (examples of logical network interfaces). A logical host channel adapter is coupled to one operating system, but an operating system may be coupled to one or more logical host channel adapters, in this particular embodiment.

A logical host channel adapter is configured to have one or more logical ports 112 that are coupled to one or more logical switches 114. For instance, a specific logical port 116 is coupled to a logical port 118 of a logical switch 114. Each logical switch, in this example, is coupled to a physical port 120. The physical ports enable connectivity to other external nodes, such as INFINIBAND® nodes, including switches.

One example of a virtualized host channel adapter is the INFINIBAND® host channel adapter, which is described in U.S. Pat. No. 7,283,473, entitled "Apparatus, System And Method For Providing Multiple Logical Channel Adapters Within A Single Physical Channel Adapter In A System Area Network," Arndt et al., issued Oct. 16, 2007, which is hereby incorporated herein by reference in its entirety.

Performance data for physical host channel adapters is obtained by employing hardware performance counters. However, for virtualized adapters, it is inefficient to dedicate performance counters for each of the logical resources (e.g., logical host channel adapters, logical ports) of the adapter, as it can consume large amounts of hardware resources, limiting the scalability of the design. Thus, in accordance with an aspect of the present invention, a capability is provided for minimizing the amount of hardware resources required for performance counters, while at the same time providing counters for the virtualized resources. Performance counters can be provided for each logical resource without the manager of those resources being aware that physical resources of the network adapter are being utilized. With this capability, a network interface can scale to support thousands of guests, e.g., VM guests.

To minimize the use of hardware resource for a virtualized host channel adapter, dedicated performance counters are provided for the physical ports, and in a further embodiment, for the logical partitions, but non-dedicated performance counters are provided for the logical resources of the adapter (e.g., the logical host channel adapters and/or logical ports). The various performance counters are described in further detail with reference to FIG. 2.

Figure 2:
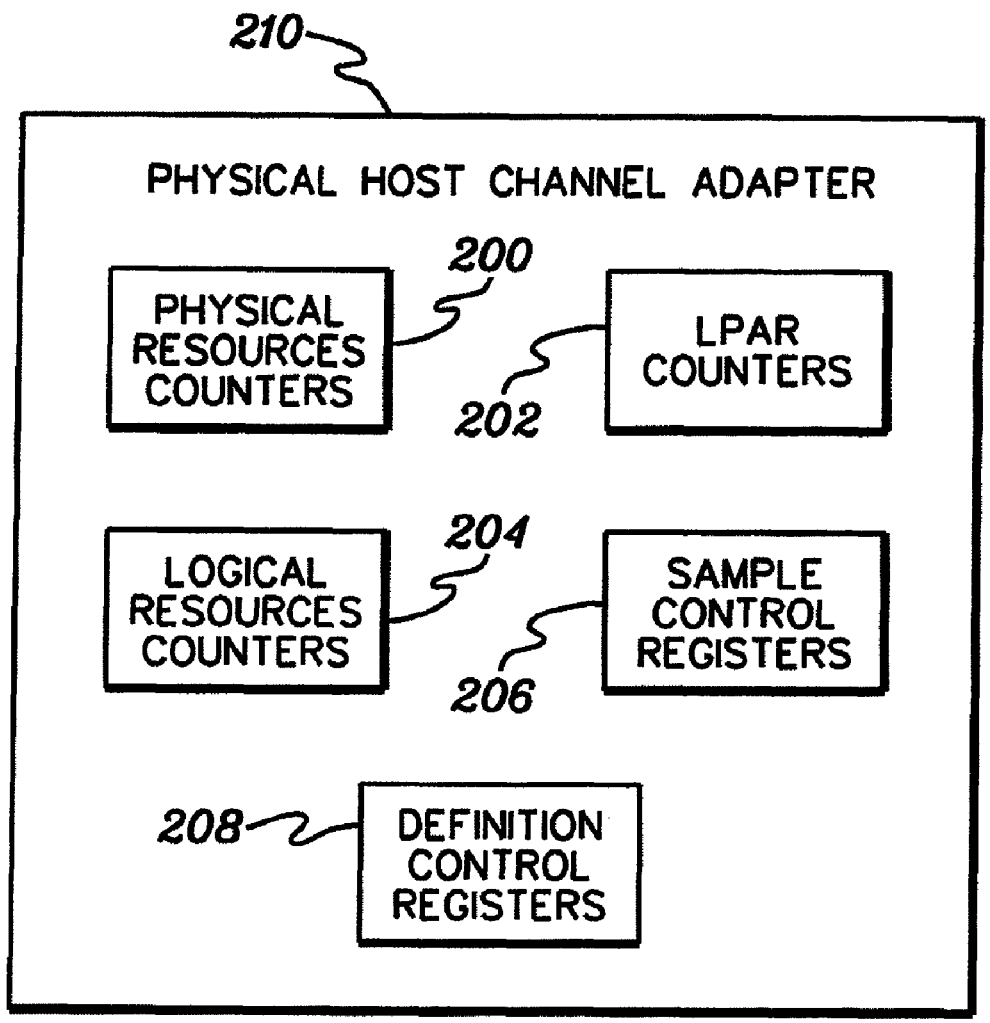
FIG. 2 depicts examples of counters and control registers maintained in the virtualized physical host channel adapter of the communications network of FIG. 1, in accordance with an aspect of the present invention.

Referring to FIG. 2, physical resources counters 200, LPAR counters 202 and logical resources counters 204 are maintained within a physical host channel adapter 210. Also maintained within the physical host channel adapter are sample control registers 206 and definition control registers 208 used in configuring and defining the logical resources counters. Each of the counters and control registers is described in further detail below.

Physical resources counters 200 are dedicated hardware performance counters provided for the physical resources (e.g., physical ports) of the physical host channel adapter. These dedicated physical resources counters include, for instance, physical port transmit and receive data counters that track the number of receive and transmit packets for a physical port. These statistical counters can be byte or packet counters. Physical resources counters 200 also include error counters that track the number of specific errors for a physical port. The type of errors to be tracked include CRC errors, invalid opcodes, etc. There is, for instance, one set of counters for each physical port to be tracked.

LPAR counters 202 are dedicated statistical hardware counters for the logical partitions. In one example, there is one set of LPAR counters for each LPAR for which performance data is desired. The counters are associated with an LPAR ID that is stored in the queue pair context and is used to associate a packet with an LPAR. (A queue pair context is used to store state information associated with a queue pair (e.g., message send and receive queues.). Such counters include, but are not limited to, transmit and receive packet and/or byte counters. These counters can be useful to higher level management functions, such as Workload Manager, offered by International Business Machines Corporation, for the purposes of billing or the allocation of shared network adapter resources.

Non-dedicated performance counters 204 (a.k.a., logical resources counters) are provided for the logical resources (e.g., logical host channel adapters and/or logical ports) of the physical host channel adapter. The non-dedicated performance counters are defined sample hardware counters that are configured in response to, for instance, a request for performance data. The non-dedicated performance counters are part of a sampling function provided, in accordance with an aspect of the present invention, to obtain performance data related to the logical resources of a logical host channel adapter without requiring dedicated hardware resources to the logical resources.

As an example, the sampling function includes logical resources counters 204, sample control registers 206 and definition control registers 208. Sample control registers 206 specify characteristics of the packets and/or bytes to be counted and stored in the logical resources counters, and definition control registers 208 specify the duration and starting time of the sample. For example, a request could be made to count the number of transmitted bytes on each virtual lane on four different switch ports starting in 1 ms, and accumulate these counts for ten seconds.

In accordance with an aspect of the present invention, one or more sampling functions, including the associated counters, are employed. As one example, a small number (e.g., equal to the number of physical ports) of sampling functions is provided to enable that number of concurrent samplings.

Figure 3:
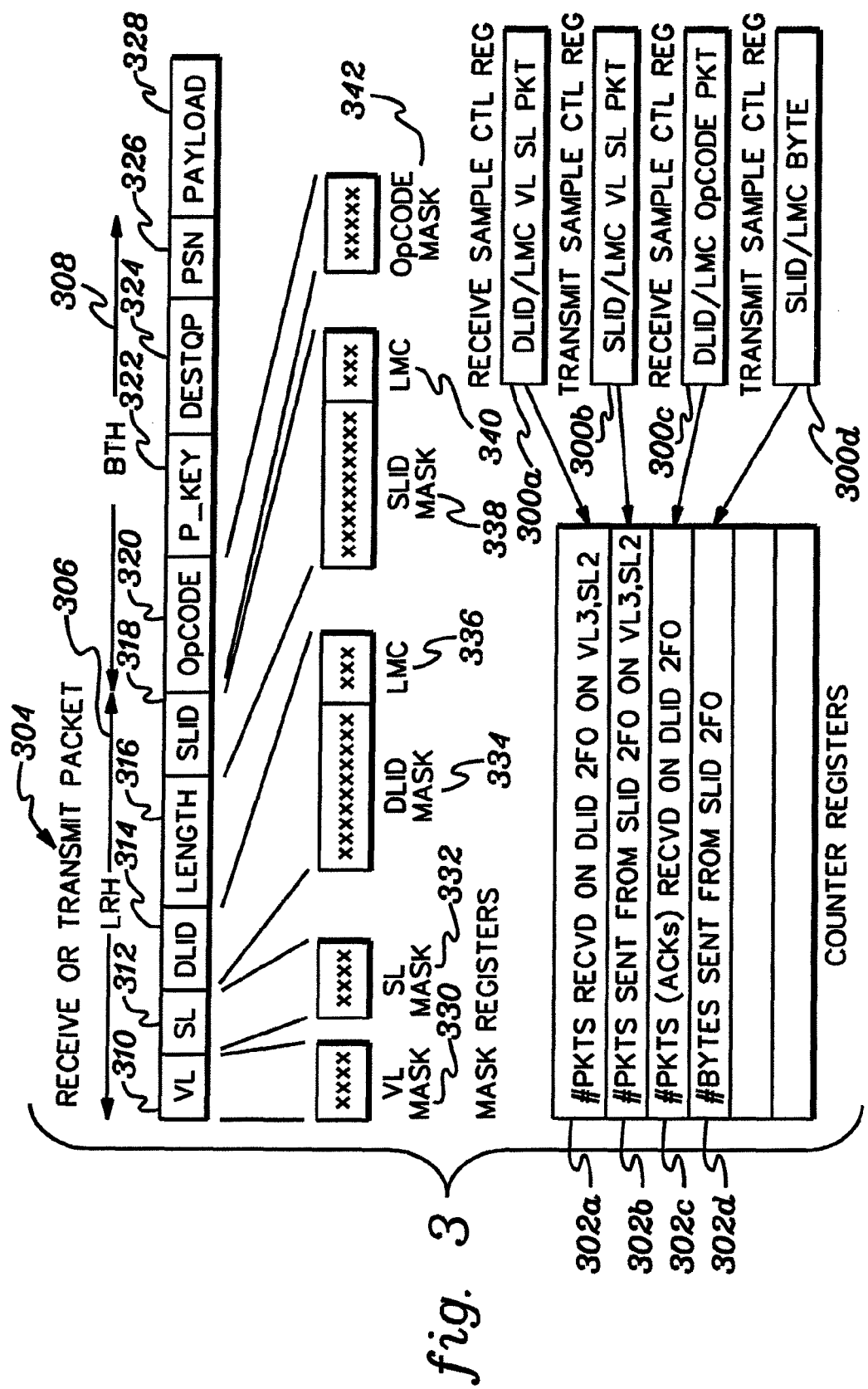
FIG. 3 depicts further details of the various counters and registers of FIG. 2, in accordance with an aspect of the present invention.

Further details regarding the correspondence between sample control registers 206 and logical resources counters 204 are described with reference to FIG. 3. As shown, there is, for instance, a sample control register 300a-300d for each provided counter 302a-302d. Each sample control register defines the attributes to be used in determining whether the associated counter is to be updated. A sample control register may be a receive control register or a transmit control register, and many of the attributes correspond to fields of a receive or transmit packet 304. Therefore, a discussion of these fields follows next.

In one example, receive or transmit packet 304 includes a local routing header (LRH) 306 and a base transport header (BTH) 308. Local routing header 306 includes, for instance: a virtual lane field 310 indicating a virtual lane of the host channel adapter through which data is to be channeled to the physical ports of the adapter; a service level field 312 indicating a service level for the packet; a destination local identifier 314 specifying the destination of the packet for a receive packet; a length field 316 indicating the length of the packet; and a source local identifier 318 identifying the source of the packet for a transmit packet.

Base transport header 308 includes, for instance: an operation code 320 indicating the operation to be performed; a partition key 322 used for validation; a destination queue pair 324 indicating the queue pair to be used to receive messages from the physical ports; a packet sequence number 326 specifying the sequence number of the packet; and a payload 328 including the data being transmitted or received.

The SLID or DLID carried in the packet header is used to associate the packet, and thus, the counter, with a logical host channel adapter port and by extension with a logical switch port. As an example, a receive sample control register, such as register 300a, may be configured to sample the incoming receive packets based on the following parameters: DLID/LMC (LID Mask Count), VL, SL, PKT (which indicates that packets are to be counted, as opposed to bytes). The particular values for those fields to be used in the matching to determine if the counter is to be incremented includes, in one example: DLID 2F0, VL 3 and SL 2. Masks are used, in one embodiment, to specify the particular values. For example, various of the packet fields have masks associated therewith that may be used in the matching. As examples, VL 310 has an associated VL mask 330; SL 312 has SL mask 332; DLID 314 has a corresponding mask 334 and an LMC mask 336 (which controls the number of bits that are masked off); SLID 314 also has a corresponding mask 338 and an LMC mask 340; and opcode 320 has an opcode mask 342. If, for instance, VL 3 is to be matched, then the VL mask is set to 3. Similarly, if SL 2 is to be matched, then the SL mask is set to 2, and so on.

The filtering and masking capability of one or more aspects of the present invention can be extended to use other packet header fields to allow the sampling function to count based on other parameters, such as DESTQP or others. The parameters described herein are only examples. Various pattern matching techniques can be used, such as whether the field is equal, not equal or whether specified bits in the field match.

In a further embodiment, each sample control register includes a control bit and an additional field that indicate whether a given field in the packet should be used to identify whether the packet should be included in the count. For instance, if a compare on VL is to be ignored, indicating that all VLs are to be counted if the other parameters match, then the control bit is set. By setting these fields as described, the mask (e.g., VL mask) is not used.

The sampling functions are managed by the hypervisor, in one embodiment. Specifically, performance management requests are redirected from the operating systems to the hypervisor, which arbitrates requests across different operating systems. In one example, the requests are serviced on a first come basis, and when all of the provided sampling functions are in use, subsequent requests are either deferred or rejected until a sampling function becomes available. Alternatively, the allocation of resources may be time sliced.

In response to receiving a performance request, the hypervisor programs the control registers so that the accumulated counts correspond to the associated operating system (logical port) and retrieves the counts after the sampling period has expired. The sampling function is then free to be used to satisfy another request. This processing is further described with reference to FIGS. 4a-4c.

One embodiment of the logic associated with providing configurable non-dedicated performance counters for logical resources is described with reference to FIGS. 4a-4c. In particular, with reference to FIGS. 4a-4b, the overall process of a sampling function is described, and with reference to FIG. 4c, details associated with the sampling are described.

Figure 4A:
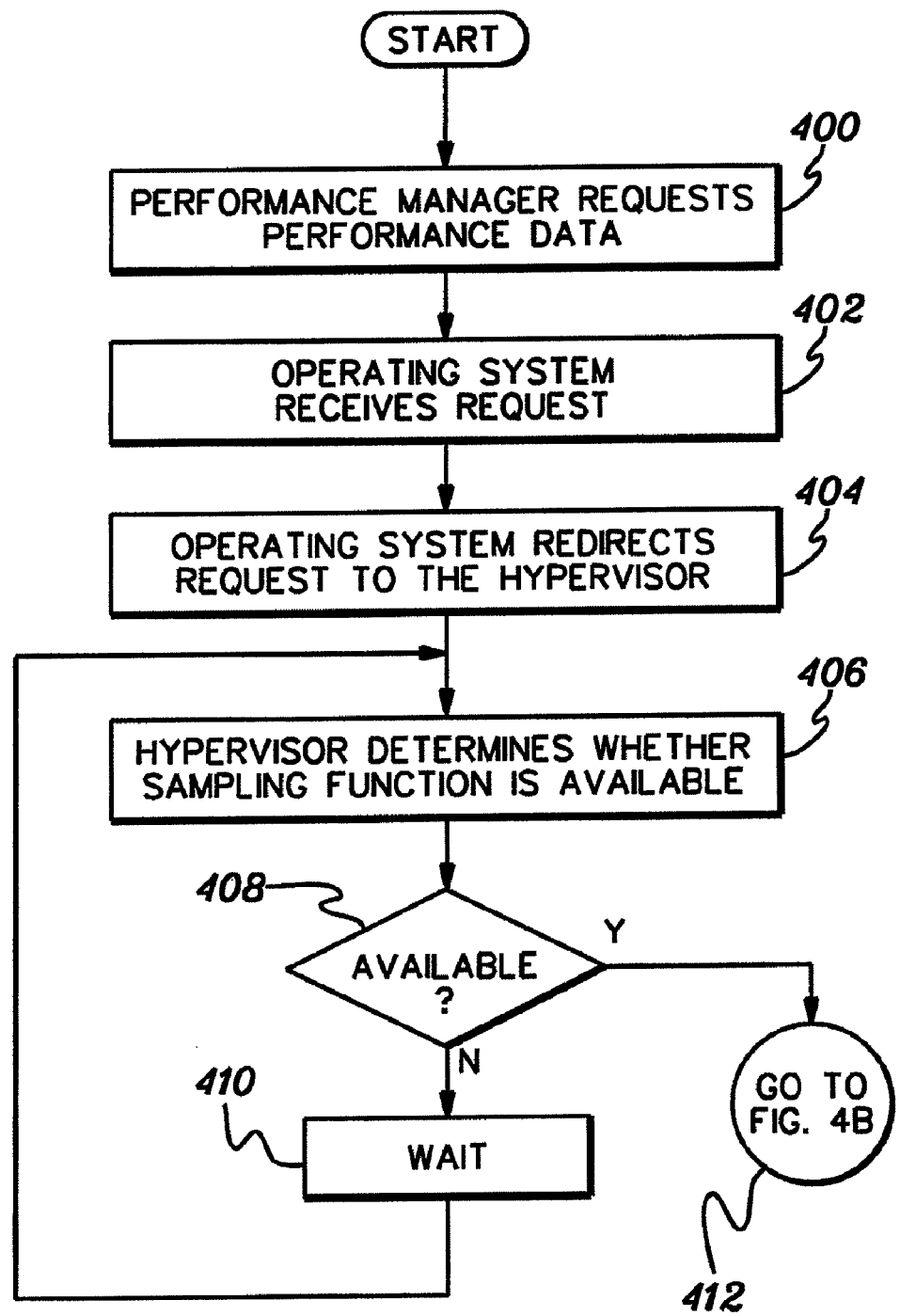
FIG. 4a depicts one embodiment of the logic associated with handling a request for performance data from a performance manager, in accordance with an aspect of the present invention.
Figure 4B:
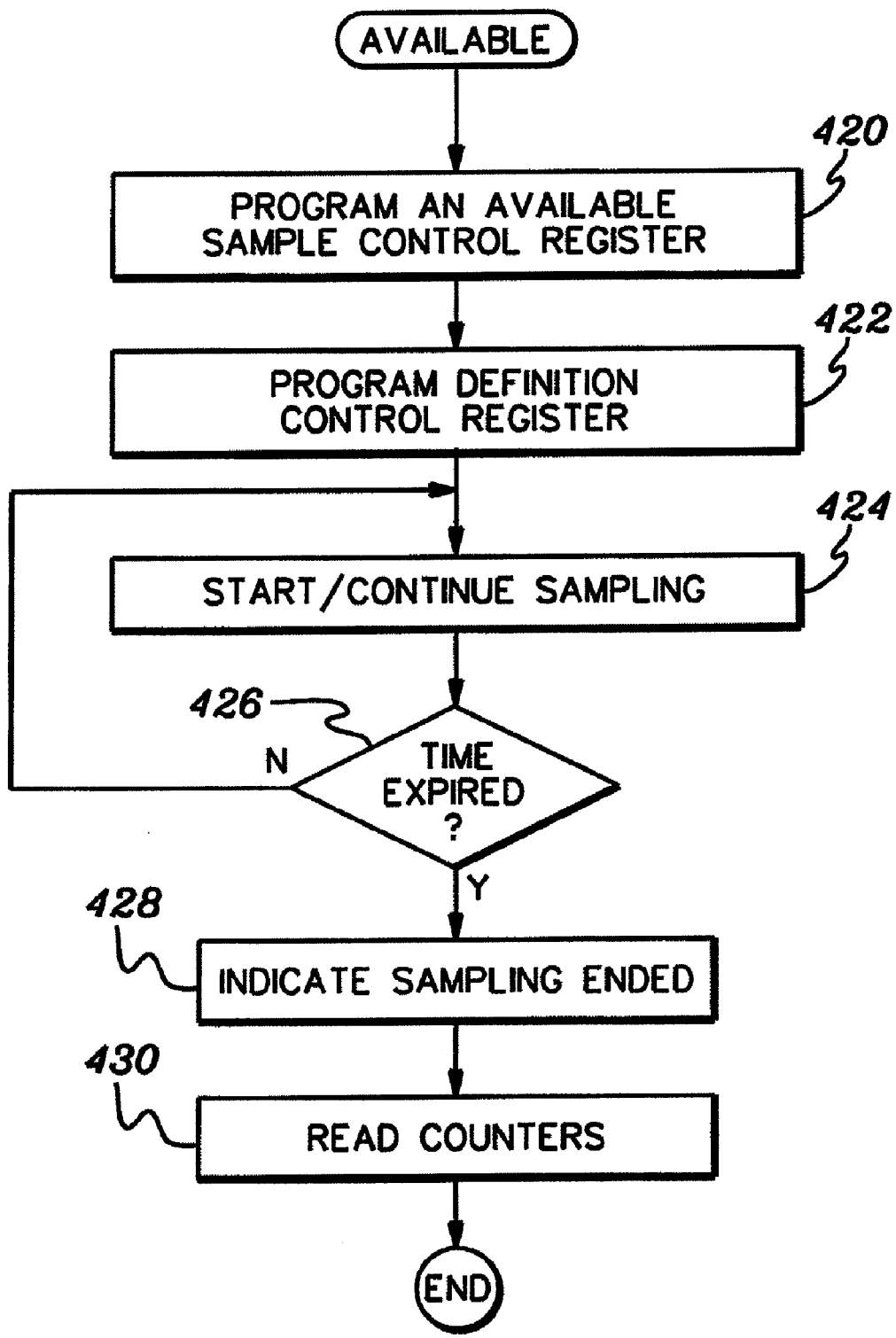
FIG. 4b depicts one embodiment of the logic associated with employing an available sample function to obtain the requested performance data, in accordance with an aspect of the present invention.
Figure 4C:
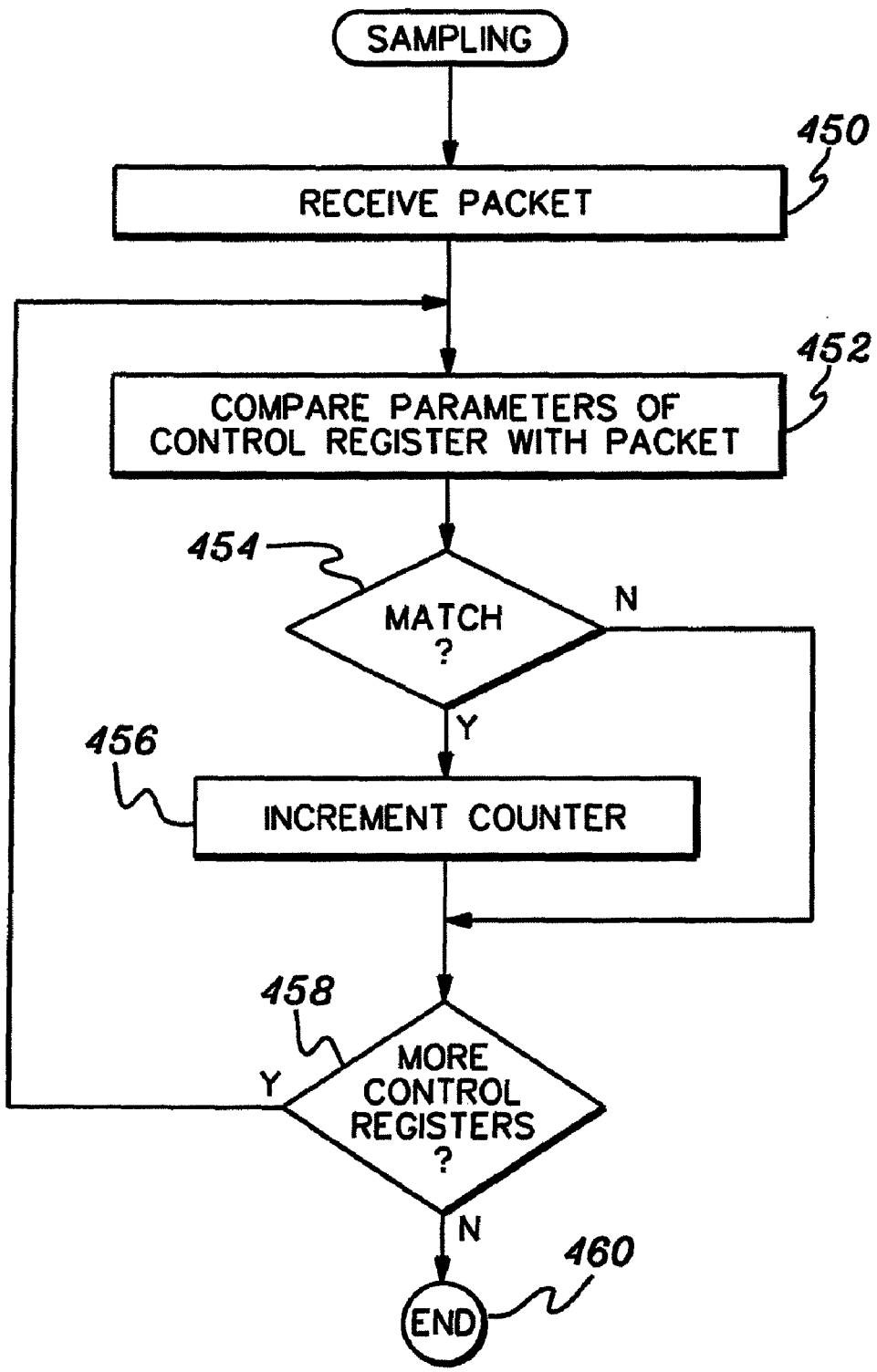
FIG. 4c depicts one embodiment of the logic associated with performing the sampling to obtain the performance data, in accordance with an aspect of the present invention.

Referring initially to FIG. 4a, a performance manager coupled to the communications network, such as the performance manager defined by INFINIBAND®, requests performance data for a particular logical port, STEP 400. The request may include, for instance, a count of the number of packets received on VL3 having an SL2. The port to which the request is sent is used in determining the LID to be used in setting up the control register to associate the count with the logical port.

An operating system coupled to the logical port associated with DLID 2F0 receives the request, STEP 402. However, since the sampling functions are shared across the logical partitions, one logical partition is not to control the sampling functions, including the control registers and counters. Thus, the hypervisor is used to control the request and the sampling function.

The hypervisor receives control from the operating system, STEP 404. In one example, the operating system redirects the request to the hypervisor using a known INFINIBAND® function called redirection. Redirection places the request on a special hypervisor queue pair for access by the hypervisor. In one example, it is a performance management agent function of the hypervisor that is to manage the performance request. Redirection is described in, for instance, *INFINIBAND™ Architecture Specification*, Vol. 1, Release 1.2, Sep. 7, 2004 available from the INFINIBAND® Trade Association, and hereby incorporated herein by reference in its entirety.

In response to receiving the request, the hypervisor determines whether there is a sampling function available to handle the request, STEP 406. To make this determination, the hypervisor keeps track of how many functions are available in total and then how many are currently in use. If a sampling function is not available, INQUIRY 408, then, in one embodiment the hypervisor waits for a predetermined amount of time, STEP 410, and then resubmits the request, STEP 406. In a further embodiment, the hypervisor sends a response back to the performance manager indicating that the request cannot be honored at this time and that the request should be sent again at a later time. In yet another embodiment, a combination of the above can be performed in which, for instance, the hypervisor can make X attempts and if still unsuccessful, then a message is sent to the performance manager. Many other alternatives also exist.

Returning to INQUIRY 408, if a sampling function is available, then processing continues, as described with reference to FIG. 4*b*.

An available sample control register is programmed by the hypervisor with the requested parameters, STEP 420. For instance, a receive sample control register is configured with DLID 2F0, VL3, SL2 and PKT. This sample control register is associated with a counter that will be updated when a packet is received in VL3 on 2F0 having a SL2.

Additionally, the hypervisor programs one of the definition control registers to indicate when to start sampling and the duration of the sampling, STEP 422. The sampling begins at the appropriate time, as dictated by the configured definition control register, STEP 424.

In response to enabling the sampling, the hardware (e.g., physical network adapter) looks at each packet received and compares it to the parameters of the configured sample control register, as described in further detail below.

During periodic intervals of the sampling, a determination is made as to whether the duration time specified in the definition control registers has expired, INQUIRY 426. If not, then sampling continues, STEP 424. When the time period expires, an indication is made that the sampling has ended, STEP 428. In one example, this is performed by the hardware generating an event up to the hypervisor to indicate completion. As a further example, a status bit may be turned on in a control register that the hypervisor periodically polls to determine if the sampling is complete. When the sampling is complete, the hypervisor reads each of the counters to obtain the count for each of the particular requested samples, STEP 430.

Further details regarding the sampling are described with reference to FIG. 4*c*. Initially, a packet is received, STEP 450. In response to receiving the packet, the parameters of the configured sample control register are compared with corresponding parameters of the packet to determine if there is a match, STEP 452. For instance, if the control register indicates DLID 2F0, VL3 and SL2, then these parameters are compared with those values in the packet. Various hardware and/or software techniques can be employed to perform the comparing, including but not limited to, comparators, exclusive OR functions or other functions or logic, and/or other matching techniques.

If there is a match, INQUIRY 454, then the counter associated with that control register is incremented, STEP 456. Thereafter, or if there is no match, a further determination is made as to whether there are more control registers to compare against the received packet, INQUIRY 458. If so, then processing continues with STEP 452. Otherwise, sampling is complete for this packet, STEP 460.

Described above is a capability for providing performance counters for virtualized network interfaces, while minimizing the amount of hardware resources required for the performance counters. With this capability, dedicated hardware performance counters are provided for the physical resources of the network interface, but programmable, non-dedicated performance counters are provided for the logical resources of the network interface. By providing non-dedicated performance counters to the logical resources, hardware resources are minimized. This allows a network interface to support thousands of guests, e.g., VM guests. Advantageously, the performance counters for the logical resources are provided to an industry-standard performance manager without the manager being aware that the physical resources of the network interface are virtualized. It appears to an external standard performance manager that the counters are provided by separate physical adapters.

To provide non-dedicated performance counters, a limited number of sampling functions are provided to minimize hardware resources. The hardware sampling functions are shared across the virtual adapters (LPARs) and access to the sampling functions is controlled by the hypervisor. Advantageously, a sampling function includes a group of counters that can be started at a configurable point in time and then accumulates the respective counts over a configurable period of time.

As an example, for the logical resources, the source LID and destination LID carried in a packet header are used to associate the packet, and thus, the counter, with a logical network interface and by extension with the logical switch port.

In another embodiment, dedicated performance counters are also provided for the logical partitions coupled to the logical resources of the network interface. The LPAR dedicated performance counters track, for instance, the number of bytes or packets transmitted or received at the LPAR via the logical resource coupled thereto. The provision of performance counters per LPAR is useful for metering in on-demand environments, and in allocation or path selection by workload managers. The LPAR ID in the queue pair context is used to associate the packet to the LPAR.

Physical error counts are only applicable to physical links, and thus, can be reported as zero for logical links. That is, link error counters are only applicable to the physical ports and do not need to be maintained for the logical ports because there is no hardware that can contribute to these kinds of errors. If link error counters are requested for a logical port, these counts can be accurately reported as zero by the performance management agent of the hypervisor.

Although embodiments and examples are described herein, many variations to the embodiments and/or examples may be made without departing from the spirit of the present invention. For example, the virtualized network interface may be other than a host channel adapter. As further examples, the operating systems may be other than those described herein and the hypervisor may be other than the POWER Hypervisor. Further, the communications environment may include more, less or different components. Yet further, the environment may be of a different architecture. In yet a further embodiment, for one or more aspects of the present invention, the environment may not be a logically partitioned environment.

In another embodiment, the counters may be stored in memory, instead of hardware. Many other variations may exist, without departing from the spirit of the present invention.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for providing performance counters for virtualized network interfaces of communications networks, the computer program product comprising:
a non-transitory storage medium readable by a processor and storing instructions for execution by the processor for performing a method comprising:
having a virtualized physical network interface of a communications network, wherein the virtualized physical network interface comprises a plurality of resources, including at least one physical port and a plurality of logical host channel adapters, said plurality of logical host channel adapters being coupled to a plurality of logical partitions of a computing environment;
providing performance counters for at least multiple resources of the plurality of resources, wherein the providing a performance counter for a particular resource of the multiple resources is based on whether the particular resource is a physical port or a logical host channel adapter, wherein one type of performance counter is provided for a physical port and a different type of performance counter is provided for a logical host channel adapter, wherein the providing comprises:
providing at least one dedicated hardware performance counter to the at least one physical port; and
providing one or more programmable counters for the plurality of logical host channel adapters, said one or more programmable counters to be shared by the plurality of logical host channel adapters, and wherein at least one programmable counter of the one or more programmable counters is associated with a logical host channel adapter of the plurality of logical host channel adapters in response to a request, during processing, for performance data, rather than being dedicated to the logical host channel adapter.

2. The computer program product of claim 1, wherein the providing one or more programmable counters comprises configuring one or more control registers to define the one or more programmable counters, the one or more control registers comprising one or more parameters used to indicate the performance data to be tracked by the one or more programmable counters, and wherein a specific value for a parameter of the one or more parameters is indicated in a mask, said mask being associated with a field of a receive packet or a transmit packet, said receive packet including data received from a source specified in the packet and said transmit packet including data to be transmitted to a destination specified in the packet.

3. The computer program product of claim 2, wherein there is a one-to-one correspondence between the one or more control registers and the one or more programmable counters.

4. The computer program product of claim 3, wherein the method further comprises updating a programmable counter of the one or more programmable counters, said updating comprising using one or more parameters of the control register corresponding to the programmable counter to determine the programmable counter is to be updated.

5. The computer program product of claim 4, wherein the using comprises comparing one or more parameters of the control register associated with the programmable counter to one or more parameters of a packet to determine that the programmable counter is to be updated, the packet comprising the receive packet or the transmit packet.

6. The computer program product of claim 1, wherein the one or more programmable counters comprise one or more dedicated transmit and receive data counters.

7. The computer program product of claim 1, wherein the method further comprises receiving a request for performance data for the logical host channel adapter, and wherein the providing at least one programmable counter for the logical host channel adapter comprises:
starting a sampling function in response to the request, said sampling function including:
configuring a control register to define the programmable counter, the control register comprising one or more parameters to be used to indicate the performance data of the logical host channel adapter to be tracked by the programmable counter;
sampling one or more packets using at least one parameter of the control register to determine if the programmable counter is to be updated; and
updating the programmable counter based on the sampling.

8. The computer program product of claim 7, wherein the method further comprises:
determining whether there is an available sampling function to be started; and
starting the sampling function in response to the sampling function being available.

9. A computer system for providing performance counters for virtualized network interfaces of communications networks, the computer system comprising:
a memory; and
a processor in communications with the memory, wherein the computer system is capable of performing a method, said method comprising:
having a virtualized physical network interface of a communications network, wherein the virtualized physical network interface comprises a plurality of resources, including at least one physical port and a plurality of logical host channel adapters, said plurality of logical host channel adapters being coupled to a plurality of logical partitions of a computing environment;
providing performance counters for at least multiple resources of the plurality of resources, wherein the providing a performance counter for a particular resource of the multiple resources is based on whether the particular resource is a physical port or a logical host channel adapter, wherein one type of performance counter is provided for a physical port and a different type of performance counter is provided for a logical host channel adapter, wherein the providing comprises:

providing at least one dedicated hardware performance counter to the at least one physical port; and providing one or more programmable counters for the plurality of logical host channel adapters, said one or more programmable counters to be shared by the plurality of logical host channel adapters, and wherein at least one programmable counter of the one or more programmable counters is associated with a logical host channel adapter of the plurality of logical host channel adapters in response to a request, during processing, for performance data, rather than being dedicated to the logical host channel adapter.

10. The system of claim 9, wherein the providing one or more programmable counters comprises configuring one or more control registers to define the one or more programmable counters, the one or more control registers comprising one or more parameters used to indicate the performance data to be tracked by the one or more programmable counters, and wherein a specific value for a parameter of the one or more parameters is indicated in a mask, said mask being associated with a field of a receive packet or a transmit packet, said receive packet including data received from a source specified in the packet and said transmit packet including data to be transmitted to a destination specified in the packet.

11. The system of claim 10, wherein there is a one-to-one correspondence between the one or more control registers and the one or more programmable counters.

12. The system of claim 11, wherein the method further comprises updating a programmable counter of the one or more programmable counters, said updating comprising using one or more parameters of the control register corresponding to the programmable counter to determine the programmable counter is to be updated.

13. The system of claim 12, wherein the using comprises comparing one or more parameters of the control register associated with the programmable counter to one or more parameters of a packet to determine that the programmable counter is to be updated, the packet comprising the receive packet or the transmit packet.

14. The system of claim 9, wherein the one or more programmable counters comprise one or more dedicated transmit and receive data counters.

15. The system of claim 9, wherein the method further comprises receiving a request for performance data for the logical host channel adapter, and wherein the providing at least one programmable counter for the logical host channel adapter comprises:

starting a sampling function in response to the request, said sampling function including:

configuring a control register to define the programmable counter, the control register comprising one or more parameters to be used to indicate the performance data of the logical host channel adapter to be tracked by the programmable counter;

sampling one or more packets using at least one parameter of the control register to determine if the programmable counter is to be updated; and updating the programmable counter based on the sampling.

16. The system of claim 15, wherein the method further comprises:

determining whether there is an available sampling function to be started; and starting the sampling function in response to the sampling function being available.

* * * * *